Dec. 25, 1923.
O. H. G. STEED
1,478,925
LOADING AND DISCHARGE PIPE LINE SYSTEM FOR OIL TANKERS
Filed Dec. 1, 1922  2 Sheets-Sheet 1
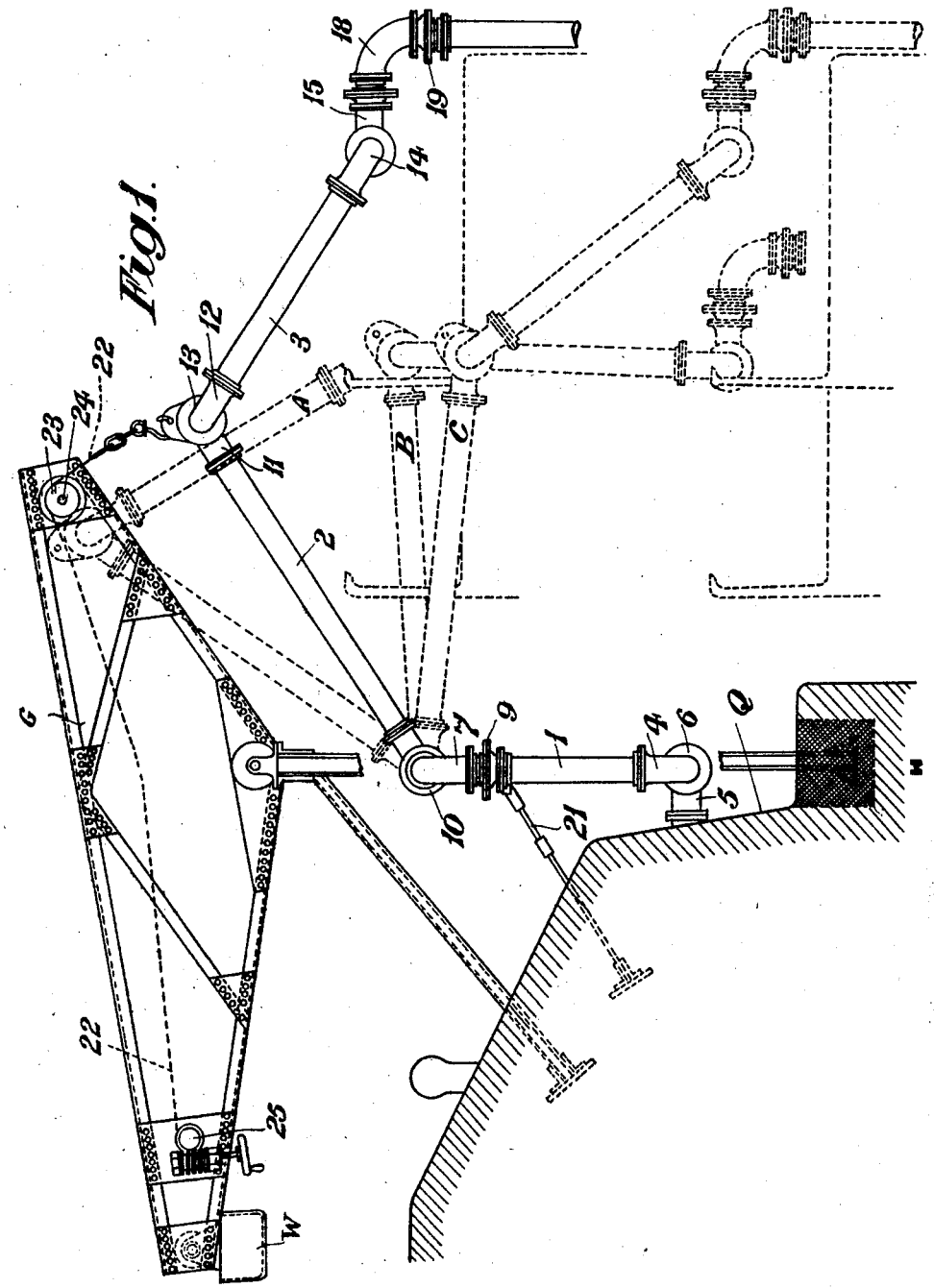

Dec. 25, 1923. 1,478,925
O. H. G. STEED
LOADING AND DISCHARGE PIPE LINE SYSTEM FOR OIL TANKERS
Filed Dec. 1, 1922 2 Sheets-Sheet 2

Inventor-
Otho Henry George Steed,
By B. Singer, Atty.

Patented Dec. 25, 1923.

1,478,925

UNITED STATES PATENT OFFICE.

OTHO HENRY GEORGE STEED, OF STAFFORD, ENGLAND.

LOADING AND DISCHARGE PIPE-LINE SYSTEM FOR OIL TANKERS.

Application filed December 1, 1922. Serial No. 604,376.

*To all whom it may concern:*

Be it known that I, OTHO HENRY GEORGE STEED, a subject of the King of Great Britain, and resident of Stafford, in the county of Stafford, England, have invented certain new and useful Improvements in Loading and Discharge Pipe-Line Systems for Oil Tankers, of which the following is a specification.

This invention relates to loading and discharge systems for oil tanks on ships and more particularly to the construction and arrangement of the pipe line affording communication between the storage reservoir and the tank whereby the latter is adapted to be loaded or discharged.

Much difficulty has been heretofore experienced in connection with these pipe lines owing to the fact that, as the tank in a ship is liable during the period of loading to considerable movement, both vertically on account of tide and displacement variations, and horizontally broadside and fore and aft on account of the swell, the pipe line must be such as to provide for universal flexibility within fairly wide limits.

It has been the common practice therefore to adopt ordinary armoured flexible tubing for this pipe line and to work at the relatively low pressures which such tubing demands; but even at such low pressures leakages and breakages are of constant occurrence and the tubing has to be renewed periodically at short intervals.

The object of the present invention is the provision of a pipe line which, while providing for universal flexibility, will be capable of withstanding high pressures for loading and discharge whereby the time occupied in loading and discharge is very materially reduced, and which pipe line will moreover be of great durability and strength.

The invention to this end consists broadly in the provision between the storage reservoir and the tank of a pipe line comprising a pipe line constructed of rigid pipe lengths connected together by fluid tight joints permitting of relative angular movement of the adjacent sections, wherein the two central rigid sections of the pipe line are connected together by a joint admitting of their relative movement in a vertical plane while their outer ends are connected to the other adjacent members of the system by universal joints admitting of relative angular movement in both vertical and horizontal planes.

A further important and novel feature of the invention in its preferred form resides in the character of the device by which it is proposed to support the pipe line intermediate its two ends, such device including simple and effective means whereby the necessary movements of the intermediate portions of the line corresponding to the movements of the vessel are freely permitted without any reduction in the efficiency of the support.

One embodiment of the invention is illustrated in the accompanying drawings and the same will now be described, it being understood that the structure illustrated is susceptible of various modifications without departing from the scope of the appended claims.

In these drawings:—

Figure 1 illustrates the embodiment in side elevation (i. e. looking endwise of the ship and the quay side) the full lines showing the structure when the ship is at its maximum level and maximum distance from the quay, and the dotted lines indicating the disposition of the pipe line when the ship is at the other several critical positions.

Figure 3:
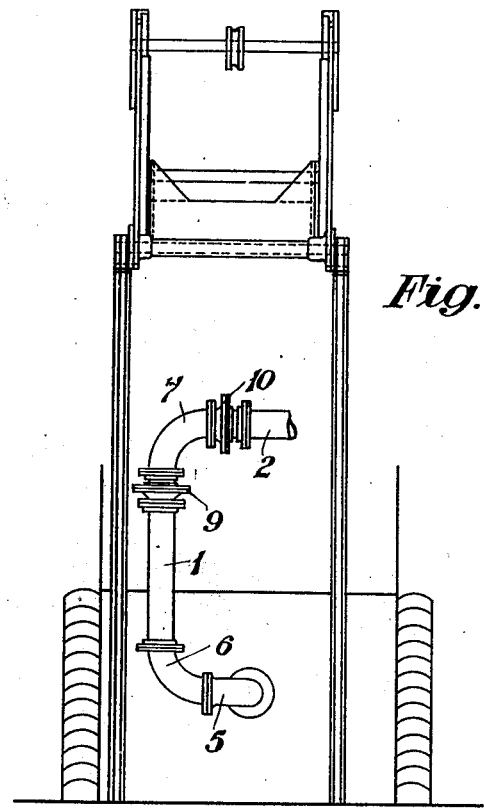
Figure 3 is an end view of the structure with part of the pipe line broken away.
Figure 2:
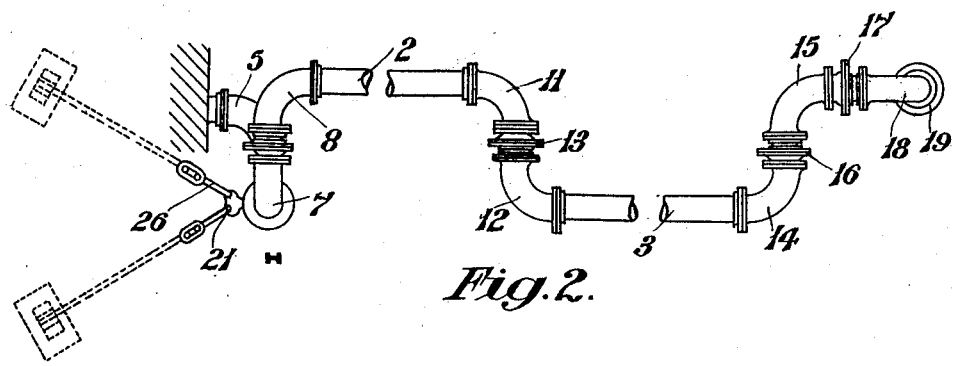
Figure 2 is a plan view of the pipe line with the ship at its maximum level and maximum distance from the quay.

Referring to these drawings and particularly to Figure 1 the same illustrate three lengths of straight steel tubing 1, 2 and 3 of the desired diameter—say, for instance, nine inches—and about four, eleven and eight feet long respectively. The length 1 is disposed substantially vertical adjacent the quay Q and is connected with the source of oil supply at its lower end through the medium of two right angle bends 4 and 5 having between them a rotary joint 6 rotatable in a vertical plane perpendicular to the side of the ship. At its upper end said length 1 is connected through the medium of two right angle bends 7 and 8 to the length 2, one rotary joint 9 rotatable in a horizontal plane being disposed between the length 1 and the right angle bend 7 and another rotary joint 10 rotatable in a vertical plane perpendicular to the side of the vessel being disposed between said two right angle bends 7 and 8, the said length 2 being thus capable of swinging universally from its point of connection with the length 1.

The length 2 is connected at its end remote from the length 1, to the length 3 through the medium of two right angle bends 11 and 12 having between them a single rotary joint 13 rotatable in a vertical plane perpendicular to the side of the vessel, and the length 3 is similarly connected through the medium of right angle bends 14 and 15 and rotary joints 16 and 17 to a bend pipe 18 which in turn communicates with the inlet pipe of the ship through the medium of a rotary joint 19 and a universal joint not shown for which latter joint vertical and horizontal joints similarly arranged to those between the pipe lengths 1 and 2 could be substituted if desired.

From the above it will be readily understood that the pipe line as a whole will be flexible universally to provide for all the movements of the vessel hereinbefore enumerated. The broad side and vertical movements will be taken up by the vertical joints, and the fore and aft movements primarily by the horizontal joint together with the universal joint, though the vertical joints will also rotate slightly during fore and aft movement. Thus when the ship is at its maximum level and minimum distance from the quay the vertical joints 10, 13 and 16 will permit of the pipe line to contract to the position indicated in dotted lines at A and when the ship is at its minimum level and minimum and maximum distances respectively from the quay, the said vertical joints will permit of the line to assume the positions indicated at B and C. Further it is clear that for any of the above positions of the vessel the horizontal joints together with the universal joint 19 will permit of considerable latitude in respect of fore and aft movement.

In addition to the support constituted at the two ends of the pipe line by the quay and the ship respectively, the said line is supported both at the upper end of the length 1 and intermediate the two lengths 2 and 3:—at the former position by two tie bars 26 and 21 attached to the quay and maintaining the length 1 substantially stationary during operation, and at the latter position by means of an overhead suspension line 22 depending from a pulley 23 mounted so as to be rotatable and laterally slidable upon an axis 24 carried at the forward end of a pivoted structure or gantry G having an after counter-balance weight W, a winding drum 25 operated by a worm wheel mechanism being further provided at the after end of said structure G whereby the suspension line 22 may be drawn in or played out to prevent the structure from tilting inconveniently in response to the broadside and vertical movement of the vessel.

It should be clearly understood that I do not limit myself to the exact disposition of the pipes and joints or to the exact supporting arrangements which I have described above:—

For instance the horizontally rotatable joint 9 might alternatively be disposed at the lower end of the length 1 and the pipe line supported from the points between the length 1 and the length 2 and between the length 2 and the length 3 respectively by a common suspension line connected to said points and passing over the fore pulley either of a structure such as the structure G or of a derrick having other suitable supporting means preferably of counter-balance construction.

Suitable joints for use in connection with this invention are those described in the specifications prior patent applications Ser. No. 305,817, filed June 31st, 1919, and Ser. No. 567,698, filed June 12th, 1922.

I am aware that in a water supply system in which a rigid pipe or pipes are embedded in sand at the bottom of a river and through which water is drawn to a pumping station after being filtered by the sand, it has already been proposed to provide both the delivery pipe and the strainer pipes secured to the delivery pipe with universal joints; and that it has been proposed in an overhead suspended and articulated pipe system to have the male members of rotary joints stayed together for the purpose of preventing bending stresses acting injuriously on the joints, the said joints connecting together rigid pipe lengths so as to form pipe lines which are adapted to extend between two points relatively movable in a given plane. To the best of my knowledge and belief however the problem has never been met of providing a pipe line of rigid lengths which will be suitable for affording communication between two structures adapted to move relatively in all directions.

What I claim and desire to secure by Letters Patent is:—

1. A loading and discharging system of pipes for oil tankers comprising a pipe line constructed of a plurality of rigid pipe lengths connected together by angularly movable fluid tight joints permitting of the relative angular movement of the adjacent sections, the two central sections of the pipe being connected together by a joint admitting of their relative movement in a vertical plane, while their outer ends are connected to the other adjacent members of the system by universal joints admitting of relative angular movement in both vertical and horizontal planes.

2. A loading and discharging system of pipes for oil tankers comprising a pipe line constructed of rigid pipe lengths connected together by angularly movable fluid tight joints, and overhead suspension line for supporting the pipe line and associated with means for automatically maintaining it in tension, the two central rigid sections of the pipe being connected together by a joint connected to the suspension line and allowing them to move relatively to one another in the vertical plane when moved into any position by the suspension line.

3. A loading and discharging system of pipes for oil tankers comprising a pipe line constructed of rigid pipe lengths connected together by angularly movable fluid tight joints, a suspension line for supporting the pipe line, a counterweighted overhanging pivoted gantry having a suspension line pulley at its overhanging end, and means for playing out and drawing in the suspension line, the two central rigid sections of the pipe line being connected together by a joint connected to the suspension line and allowing them to move relatively to one another in the vertical plane when moved into any position by the suspension line, the end of the suspension line passing over the pulley on the gantry to the means for playing out and drawing it in.

4. A loading and discharging system of pipes for oil tankers comprising a pipe line constructed of rigid pipe lengths connected together by angularly movable fluid-tight joints, a suspension line for supporting the pipe line, a counterweighted overhanging pivoted gantry having a laterally movable suspension line pulley at its overhanging end, and means for playing out and drawing in the suspension line, the two central rigid sections of the pipe line being connected together by a joint connected to the suspension line and allowing them to move relatively to one another in the vertical plane when moved into any position by the suspension line, the end of the suspension line passing over the pulley on the gantry to the means for playing it out and drawing it in.

In witness whereof I affix my signature.

OTHO HENRY GEORGE STEED.